US012684376B2

(12) United States Patent
    Deshlehra et al.

(10) Patent No.: US 12,684,376 B2
(45) Date of Patent: Jul. 14, 2026

(54) APPARATUS AND METHOD FOR HIGHLY UTILIZED CELL IDENTIFICATION

(71) Applicant: RAKUTEN MOBILE, INC., Tokyo (JP)

(72) Inventors: Gourav Deshlehra, Indore (IN); Manish Patidar, Indore (IN); Deepak Vishwakarma, Indore (IN); Akshay Gujar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 1042 days.

(21) Appl. No.: 17/791,456

(22) PCT Filed: Apr. 15, 2022

(86) PCT No.: PCT/US2022/024950
§ 371 (c)(1),
(2) Date: Oct. 19, 2023

(87) PCT Pub. No.: WO2023/200453
PCT Pub. Date: Oct. 19, 2023

(65) Prior Publication Data
US 2024/0179544 A1     May 30, 2024

(51) Int. Cl.
*H04W 24/08* (2009.01)
*H04W 28/02* (2009.01)
(52) U.S. Cl.
CPC ....... *H04W 24/08* (2013.01); *H04W 28/0284* (2013.01)

(58) Field of Classification Search
None
See application file for complete search history.

(56) References Cited

U.S. PATENT DOCUMENTS

| | | | |
|---|---|---|---|
| 2016/0014617 A1 | 1/2016 | Sofuoglu et al. | |
| 2016/0183130 A1* | 6/2016 | Farkas ................. | H04W 72/12 455/436 |
| 2018/0368037 A1* | 12/2018 | Wang ............... | H04W 28/0205 |
| 2019/0104512 A1* | 4/2019 | Vura ..................... | H04W 72/02 |
| 2021/0168623 A1* | 6/2021 | Gupta .................. | H04W 24/02 |

(Continued)

OTHER PUBLICATIONS

International Search Report dated Jun. 30, 2022 from the International Searching Authority in International Application No. PCT/US2022/024950.

(Continued)

*Primary Examiner* — Andre Tacdiran
(74) *Attorney, Agent, or Firm* — Sughrue Mion, PLLC

(57) ABSTRACT
A method, system, apparatus, and computer-readable medium for identifying highly utilized cells within a network based on one or more key performance indicators. The method can comprise receiving first key performance indicator (KPI) data with respect to a cell within the network, receiving a first criteria with respect to the first KPI data, and determining if the first KPI data meets the first criteria. The method can also comprise upon determining that the first KPI meets the first criteria, determining if the first KPI data is consistent over a defined period, and upon determining that the first KPI data is consistent, designating the cell as a cell that includes high network utilization or above average network utilization.

17 Claims, 10 Drawing Sheets

(56)     References Cited

U.S. PATENT DOCUMENTS

2022/0322181 A1*  10/2022  Parekh ............ H04W 36/00837
2024/0064531 A1*   2/2024  Bizzarri ............... H04W 24/02

OTHER PUBLICATIONS

Written Opinion dated Jun. 30, 2022 from the International Search-
ing Authority in International Application No. PCT/US2022/
024950.

* cited by examiner ( COST CONSCIOUS
APPROACH PROCESSES)

(BALANCED APPROACH
PROCESSES)

(QUALITY CONSCIOUS
APPROACH PROCESSES)

| Domain: | Vendor: | | | Date: | | Band: | View: | | | | | |
| | | | | | | All | Daily | | | | | |

| Daily Total Traffic | BBH Traffic | Total Highly Utilized cells | Consistent Critically Congested Cells Count |
| --- | --- | --- | --- |
| Last Ten Days | Last Ten Days | Last Ten Days | Last Ten Days |
| 999.14 TB | 72.62 TB | 1,142 | 80 |

| Network Region | Total Cells | Daily Total Traffic (TB) | BBH Traffic (TB) | Highly Utilized Cells (H.U.C) | % Change in H.U.C from same day previous week | Class 1 Sectors | Class 2 Sectors |
| --- | --- | --- | --- | --- | --- | --- | --- |
| Total | 26258 | 999.14 | 72.62 | 1142 | ⌄ 0.95 | 1114 | 14 |
| Region 1 | 2 | 0.00 | 0.00 | 0 | ~ | 0 | 0 |
| Region 2 | 0 | 0.00 | 0.00 | 0 | ~ | 0 | 0 |
| Region 3 | 1634 | 38.56 | 3.06 | 9 | ⌄ 10 | 9 | 0 |
| Region 4 | 10995 | 384.82 | 28.99 | 396 | ⌃ 0.00 | 384 | 6 |
| Region 5 | 12511 | 543.42 | 38.15 | 727 | ⌄ 1.22 | 711 | 8 |

FIG. 10

APPARATUS AND METHOD FOR HIGHLY UTILIZED CELL IDENTIFICATION

CROSS REFERENCE TO RELATED APPLICATIONS

This application is a National Stage of International Application No. PCT/US2022/024950 filed Apr. 15, 2022.

TECHNICAL FIELD

The present disclosure relates to monitoring and identifying highly utilized cells within telecommunication networks, including visualization of such cells on a Graphical Information System ("GIS") view map.

BACKGROUND

One of the main requirements that every cellular network operator faces is to ensure that the network is operating at its maximum efficiency. As a result, cellular network monitoring and optimization is a main component of many modern cellular networks. In order to guarantee the best possible performance to the cellular network subscribers, the network is monitored and periodically optimized so that its resources can be more effectively utilized within the core network and/or the Radio Access Network ("RAN"). Typically, network optimization is affected by manually modifying network parameters in the Radio and Core Networks based on information that relates to network performance. Such information is retrieved periodically and analyzed by the Operations and Support System ("OSS") to derive key performance indicators ("KPIs") therefrom. Current KPIs include typical system level (e.g., related to user or cell throughputs) and link level (e.g., various transmission error rates) metrics.

In addition, cellular networks typically employ a small cell network to improve network availability, coverage, quality, resilience, and throughput, particularly with respect to "5G" networks. Generally, small cells are low-powered radio access nodes employed by wireless carriers to expand the density of existing wireless network, such as that of macro cells or base stations. These small cells can operate within a licensed or unlicensed spectrum, and can generally include femtocells, picocells, and microcells, among others. In addition, such small cells can be installed in various indoor and outdoor locations, such as on buildings, street posts, and on ceilings within indoor spaces, among other places.

Currently, there is no efficient way of monitoring, optimizing, and reporting cellular network traffic and other KPI data and further determining which cells within a network are highly utilized. Related art data and reporting times of such cells can typically take up to a day or longer to process and be presented to a network operator. In addition, related art systems lack resources to present such data and reports in a streamlined and visually efficient manner, thereby resulting in reports being placed in queue while awaiting resources to become available. Hence, there is a need to efficiently and effectively manage and monitor the utilization of cells within a geographic region at any given time using various types criteria and KPI data.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

A highly utilized cell monitoring and identification process, system, apparatus, and computer-readable medium are disclosed that efficiently and effectively processes network traffic and various types of KPI data on a daily basis to be efficiently presented and reported to a user within a graphical user interface portal, wherein such portal further identifies the cells that are highly utilized within the network.

According to embodiments, a method of identifying utilized cells within a network based on one or more key performance indicators includes receiving first key performance indicator (KPI) data with respect to a cell within the network; receiving a first criteria with respect to the first KPI data; and determining if the first KPI data meets the first criteria. The method can also include upon determining that the first KPI meets the first criteria, determining if the first KPI data is consistent over a defined period; and upon determining that the first KPI data is consistent, designating the cell as a cell that includes high network utilization or above average network utilization. In addition, the method can further include receiving a second KPI with respect to the cell within the network; receiving a second criteria with respect to the second KPI data; and determining if the second KPI data meets the second criteria. Moreover, the method can also include upon determining that the first KPI data meets the first criteria and the second KPI data meets the second criteria, determining if the first KPI data and the second KPI data are consistent over a defined period; and upon determining that the first KPI data and the second KPI data are consistent, designating the cell as a cell that includes high network utilization or above average network utilization. In addition, the method can include receiving a third KPI with respect to the cell within the network; receiving a third criteria with respect to the third KPI data; determining if the third KPI data meets the third criteria; upon determining that the first KPI data meets the first criteria, the second KPI data meets the second criteria, and the third KPI data meets the third criteria, determining if the first KPI data, second KPI data, and third KPI data are consistent over the defined period; and upon determining that the third KPI data is consistent, designating the cell as a cell that includes high network utilization or above average network utilization.

In addition, the method can also include upon determining that the first KPI does not meet the first criteria, designating the cell as a cell that includes normal or average network utilization. Further, the defined period can include a first number of days out of a second number of days. The method can also include receiving input parameters with respect to at least one: cell site inventory data, cell site boundaries data, or cell site performance management data. In addition, the method can include displaying the designated high network utilization or above average network utilization cell on a graphical user interface map. The method can also include receiving a selection of the cell on the graphical user interface map, displaying an expanded view of the cell, wherein the displayed expanded view includes one or more properties associated with the cell.

According to embodiments, an apparatus for identifying utilized cells within a network based on one or more key performance indicators includes a memory storage storing computer-executable instructions; and a processor communicatively coupled to the memory storage, wherein the processor is configured to execute the computer-executable instructions and cause the apparatus to: receive, from a user, a first key performance indicator (KPI) data with respect to a cell within the network; receive, from the user, a first criteria with respect to the first KPI data; and determine if the first KPI data meets the first criteria. In addition, wherein the computer-executable instructions, when executed by the processor, further cause the apparatus to upon determining that the first KPI meets the first criteria, determine if the first KPI data is consistent over a defined period; and upon determining that that the first KPI data is consistent, designate the cell as a cell that comprises high network utilization or above average network utilization. Further, wherein the computer-executable instructions, when executed by the processor, further cause the apparatus to receive, by the user, a second KPI with respect to the cell within the network; receive, by the user, a second criteria with respect to the second KPI data; and determine if the second KPI data meets the second criteria.

In addition, wherein the computer-executable instructions, when executed by the processor, further cause the apparatus to upon determining that the first KPI data meets the first criteria and the second KPI data meets the second criteria, determine if the first KPI data and the second KPI data are consistent over a defined period; and upon determining that the first KPI data and the second KPI data are consistent, designate the cell as a cell that comprises high network utilization or above average network utilization. Further, wherein the computer-executable instructions, when executed by the processor, further cause the apparatus to receive, by the user, a third KPI data with respect to the cell within the network; receive, by the user, a third criteria with respect to the third KPI data; determine if the third KPI data meets the third criteria; upon determining that the first KPI data meets the first criteria, that the second KPI data meets the second criteria, and that the third KPI data meets the third criteria, determine if the first KPI data, second KPI data, and third KPI data are consistent over a defined period; and upon determining that the third KPI data is consistent, designate the cell as a cell that comprises high network utilization or above average network utilization. In addition, wherein the computer-executable instructions, when executed by the processor, further cause the apparatus to upon determining that the first KPI does not meet the first criteria, designate the cell as a cell that comprises normal or average network utilization. Also, the defined period can include a first number of days out of a second number of days. In addition, wherein the computer-executable instructions, when executed by the processor, further cause the apparatus to display the designated high network utilization or above average network utilization cell on a graphical user interface map.

In another aspect of the disclosure described herein, a computing device is disclosed that include at least one memory configured to store computer program code; and at least one processor configured to access the computer program code and operate as instructed by the computer program code. The computer program code can include first receiving code configured to cause the at least one processor to receive first key performance indicator (KPI) data with respect to a cell within the network; second receiving code configured cause the at least one processor to receive first criteria with respect to the first KPI data; and first determining code configured to cause the at least one processor to determine if the first KPI data meets the first criteria. In addition, the computing device can include upon the first determining code determining that the first KPI meets the first criteria, second determining code configured to cause the at least one processor to determine if the first KPI data is consistent over a defined period; and upon the second determining code determining that that the first KPI data is consistent, designating code configured to cause the at least one processor to designate the cell as a cell that includes high network utilization or above average network utilization.

In addition, the computing device can also include third receiving code configured to cause the at least one processor to receive a second KPI with respect to the cell within the network; fourth receiving code configured to cause the at least one processor to receive a second criteria with respect to the second KPI data; and second determining code configured to cause the at least one processor to determine if the second KPI data meets the second criteria. The computing device can also include upon the first determining code determining that the first KPI data meets the first criteria and the second determining code determining that the second KPI data meets the second criteria, third determining code configured to cause the at least one process to determine if the first KPI data and the second KPI data are consistent over a defined period; and upon the third determining code determining that the first KPI data and the second KPI data are consistent, designating code configured to cause the at least one processor to designate the cell as a cell that includes high network utilization or above average network utilization.

Further, the computing device can include fifth receiving code configured to cause the at least one processor to receive a third KPI with respect to the cell within the network; sixth receiving code configured to cause the at least one processor to receive a third criteria with respect to the third KPI data; fourth determining code configured to cause the at least one processor to determine if the third KPI data meets the third criteria; upon the first determining code determining that the first KPI data meets the first criteria, second determining code determining that the second KPI data meets the second criteria, and third determining code determining that the third KPI data meets the third criteria, fourth determining configured to cause the at least one processor to determine if the first KPI data, second KPI data, and third KPI data are consistent over the defined period; and upon the fourth determining code determining that the third KPI data is consistent, designating code configured to cause the at least one processor to designate the cell as a cell that includes high network utilization or above average network utilization. The computing device can also include upon the first determining code determining that the first KPI does not meet the first criteria, designating code configured to cause the at least one processor to designate the cell as a cell that includes normal or average network utilization. In addition, the defined period can include a first number of days out of a second number of days. The computing device can also include displaying code configured to cause the at least one processor to display the designated high network utilization or above average network utilization cell on a graphical user interface map.

According to embodiments, a non-transitory computer-readable storage medium, storing one or more programs including at least one instruction is disclosed, when the at least one instruction is loaded and executed by a processor, cause the processor to receive first key performance indicator (KPI) data with respect to a cell within the network; receive a first criteria with respect to the first KPI data; and determine if the first KPI data meets the first criteria.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 10 illustrates an example graphical user interface dashboard according to one or more other embodiments.

DETAILED DESCRIPTION

Figure 1:
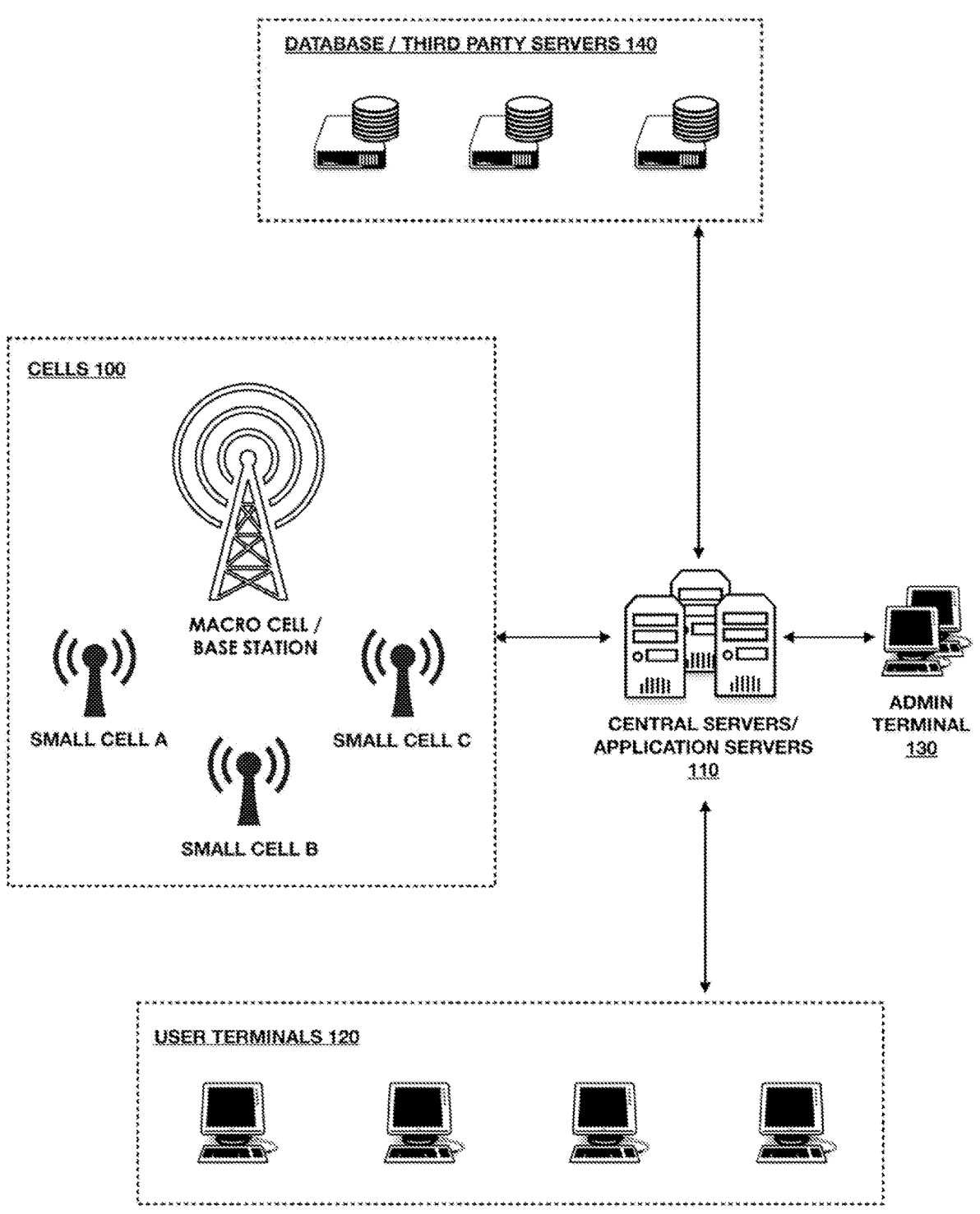
FIG. 1 illustrates a general network architecture according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a central database center and vice versa. The information may be stored in memory at each of the computing device, a data storage resided at the edge of the network, or on the servers at the central database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones, personal computers, tablets, servers, laptop computers, personal digital assistants (PDAs), roaming devices, wireless devices (such as a wireless email device or other device capable of communicating wirelessly with a computer or communications network), or any other type of network device that may communicate over a network and handle electronic transactions.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure described herein. For example, the portal can be a web page accessed with a web browser, mobile device application, or any application or software residing on a computing device.

As used herein, a highly utilized cell (hereinafter "HUC") can be any cell (small cell or otherwise) that is highly utilized within a network or has high traffic relative to other cells within the network, has above average utilization within a network, has a degree of utilization that is above a pre-defined utilization parameter (e.g., pre-defined by a telco operator), or has a degree of utilization that meets or is above an industry recognized standard with respect to network cell utilization. The system and method of one or more embodiments described herein can quickly generate and report data if a cluster is free on a timely basis which can further reduce memory utilization and other computing resources, among other advantages. In addition, the system and process of one or more embodiments described herein can further assign separate resources for report generation that the data is generated on time, or create one (or a separate) queue for data generation only, thereby further optimizing computing and network resources, among other advantages.

Here, the HUC monitoring process and system of one or more embodiments described herein can monitor and analyze multiple HUC's based on various geographical filters and KPI's, such as Average Download ("DL") Physical Resource Block ("PRB") Utilization, Average Radio Resource Control ("RRC") Connected users, DL Byte (in GB), among others, using bouncing busy hour traffic in a day. In addition, the HUC monitoring process and system of one or more embodiments described herein can perform consistency checks on various cells, such as determining from three (3) out of seven (7) days as true for one or more cells, such as further based on selected KPI's and user defined Threshold and Consistency Criteria. In addition, a HUC Graphical Information System ("GIS") user interface view can be plotted and presented on a graphical user interface ("GUI") map within a portal in the form of highly utilized cell counts, within a boundary of a predetermined range (e.g., from about 500 km to 5 km). In addition, with respect to a map zoom level of another predetermined range (e.g., from about 3 km to about 100 m), the HUC's can be graphically visualized and presented on the GUI map along with a legend and various viewing filters. In addition, a GUI table view within the portal can also be presented to the user to graphically visualize the HUC's.

In addition, the GUI portal of one or more embodiments described herein can display on a map, based on certain geographical regions, on-air cells and HUC counts with respect to a particular carrier which can be viewed from zoom levels of a predetermined range (e.g., about 500 km to about 300 km, among other ranges). In addition, the GUI portal can display on a map, based on certain geographical levels (e.g., prefecture or district areas), on-air cells and HUC counts with respect to a particular carrier which can be viewed from zoom levels of a predetermined range (e.g., about 200 km to about 100 km). The GUI portal can also display on a map, based on a city, on-air cells and HUC counts with respect to a particular carrier which can be viewed from zoom levels of about 50 km to about 30 km. In addition, the GUI portal can display on a map, based on clusters, on-air cells and HUC counts with respect to a particular carrier which can be viewed from zoom levels of about 10 km to about 5 km. The GUI portal can also display on a map a GUI visualization of HUCs and normal utilized cell sites from a zoom level of about a predetermined range (e.g., 3 km to about 100 m). In addition, within the GUI portal and map, a user can select any cell or site and an expanded "spider" view can be displayed. From the map or the expanded spider view, when the user selects a capacity element from the GUI, the system and process can display the band wise value of the cells which are either designated as HUC's or normal utilized cells. In addition, the HUC monitoring process and system of one or more embodiments described herein can also analyze and investigate the utilization of the cells and support multiple vendors or wireless carrier or network providers.

In another aspect of one or more embodiments described herein, the HUC monitoring process and system can fetch or retrieve capacity configuration from one or more databases for all algorithms, such as the HUC engine or algorithm. In addition, the process and system can also fetch cell busy bouncing hour ("BBH") data from Hbase as per a defined configuration where there are a certain inputted or defined number of days. Further, after fetching or retrieving the data, it can be joined with a network element and apply a HUC algorithm according to one or more embodiments. Further, when a certain defined condition or threshold is met, a cell can be marked as a HUC (and labeled with a color or other indicia), and if the condition or threshold is not met, then the cell can be marked as a normal utilized cell (and labeled with another color or other indicia), and the cell that does not have available data can be marked as a cell with no data (and labeled with another color other indicia). Further, the HUC identifying and monitoring process and system of one or more embodiments described herein can also store the data in MySQL tables, and further store the counts at the geographical level and further based on the cell wise status.

FIG. 1 illustrates a general network architecture of the HUC identifying and monitoring process, apparatus, computer-readable medium, and system according to one or more embodiments. Referring to FIG. 1, cells 100 can include bi-directional communication over a network with central servers or application servers 110 (e.g., via a core network). In particular, cells 100 can include any number of macro-cells, base transceivers, base stations, and small cells or nodes. For example, it is contemplated within the scope of the present disclosure described herein that there may be any number of macro-cells that communicate with their corresponding small cells, such that the small cells improve and expand cellular and wireless network (e.g., 5G, 4G, Long-Term Evolution, etc.) coverage, reliability, throughput, and quality of the macro-cells or the network provider within a given geographical region or area. It is also contemplated within the scope of the present disclosure described herein that any of cells 100, including macro-cells and small cells and any variations thereof, such as femtocells, picocells, and microcells, may be referred to herein as HUC's or normal utilized cells. As shown herein, for exemplary purposes, small cells A, B, and C may be in communication with a central or main macro-cell or base station tower network. It is understood, however, that one or more other embodiments are not limited thereto, and may not include small cells.

Still referring to FIG. 1, one or more user terminals 120 can also be in bi-directional communication over a network with central servers 110 (e.g., via a core network). Specifically, central servers 110 can receive and process user requests with respect to an HUC engine and algorithm of one or more embodiments described herein and further report and present the results to each user terminal 120. Here, each user terminal 120 may further access and view the GUI portal and map with respect to the HUC identifying and monitoring process and system of one or more embodiments. In addition, an admin terminal 130 may also be in bi-directional communication with central servers 110 to manage and monitor various types of network data, credentials, user privileges, and the like. Further, the HUC identifying and monitoring process and system according to one or more embodiments may also include one or more databases and third-party servers 140 in bi-directional communication over a network with central servers 110. Here, servers 140 can provide various types of data storage, data streams, data feeds, and/or provide various types of third-party support services to central servers 110. However, it is contemplated within the scope of the present disclosure described herein that the HUC identifying and monitoring process and system of the disclosure described herein can include any type of general network architecture (e.g., including one or more radio access networks, a core network, etc.).

Still referring to FIG. 1, one or more of servers and terminals 110-140 may include a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers and terminals 110-140 may include a set of components, such as a processor, a memory, a storage component, an input component, an output component, a communication interface, and a JSON-based UI rendering component. The set of components of the device may be communicatively coupled via a bus.

The bus may include one or more components that permit communication among the set of components of one or more of servers and terminals 110-140. For example, the bus may be a communication bus, a cross-over bar, a network, or the like. The bus may be implemented using single or multiple (two or more) connections between the set of components of one or more of servers and terminals 110-140. The disclosure is not limited in this regard.

One or more of servers and terminals 110-140 may include one or more processors. The one or more processors may be implemented in hardware, firmware, and/or a combination of hardware and software. For example, the one or more processors may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operations of one or more of servers and terminals 110-140 and/or of the set of components of one or more of servers and terminals 110-140 (e.g., memory, storage component, input component, output component, communication interface, rendering component).

One or more of servers and terminals 110-140 may further include memory. In some embodiments, the memory may include a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers and terminals 110-140 may store information and/or computer-readable instructions and/or code related to the operation and use of one or more of servers and terminals 110-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers and terminals 110-140 may further include an input component. The input component may include one or more components that permit one or more of servers and terminals 110-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component of any one or more of servers and terminals 110-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers and terminals 110-140 may further include a communication interface. The communication interface may include a receiver component, a transmitter component, and/or a transceiver component. The communication interface may enable one or more of servers and terminals 110-140 to establish connections and/or transfer communications with other devices (e.g., a server, another device). The communications may be effected via a wired connection, a wireless connection, or a combination of wired and wireless connections. The communication interface may permit one or more of servers and terminals 110-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth, Zig-Bee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
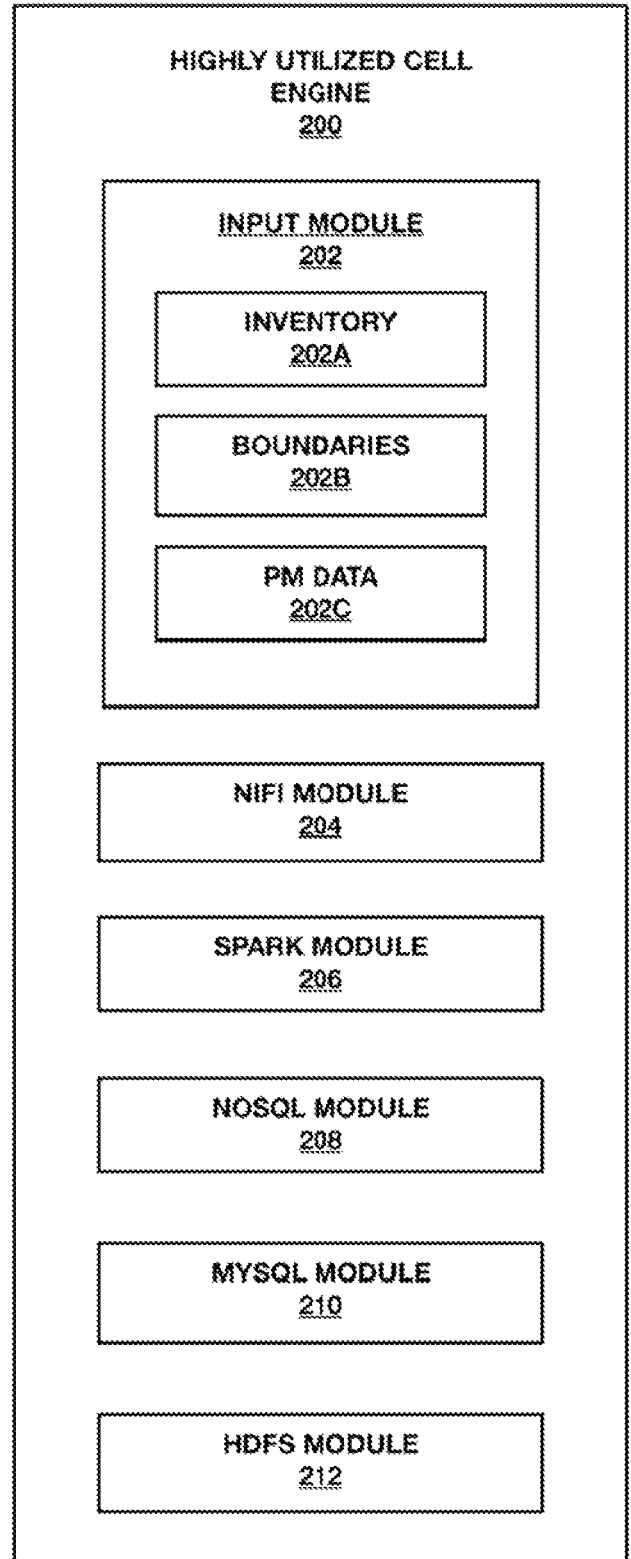
FIG. 2 illustrates a block diagram of a highly utilized cell determination engine according to one or more embodiments.

FIG. 2 illustrates a block diagram of an HUC engine according to one or more embodiments. Here, HUC engine 200 can include an input module 202 configured to provide input data and parameters to the HUC identifying and monitoring process algorithm disclosed herein, wherein the input module 202 can further include sub-module input parameters for inventory 202A, boundaries 202B, and performance management ("PM") data 202C. Specifically, the inventory input parameter sub-module 202A can include information from a database for all the cell sites within in a network, wherein such information can include, but is not limited to latitude, longitude, azimuth, band details, and on air status data, among others. The boundaries input parameter sub-module 202B can include information pertaining to any one or more geographic regions, prefecture, district, city, and cluster boundaries, among others. The PM data input parameter sub-module 202C an include information pertaining to PM cell level BBH data (cell busy hour) for any one or more or all of the KPI's used for the algorithm. In addition, HUC criteria can be defined within a Capacity Criteria GUI portal.

Still referring to FIG. 2, the HUC engine 200 can also include an NiFi component and module 204, or more specifically, an Apache NiFi dataflow system that is based on the concepts of a flow-based programming model that includes the ability to operate within clusters. The NiFi component and module 204 can be used to ingest streaming data from third-party applications, such as Boomer Cell Identification data from various Entity Management System applications. In addition, the HUC engine 200 can also include a Spark component and module 206. Here, the Spark component or module 206 can include a parallel processing framework for running large-scale data analytics applications across clustered computers. In particular, the component can handle both batch and real-time analytics and data processing workloads of the HUC monitoring process and system of the disclosure described herein. Further, the HUC engine 200 can also include a NoSQL component or module 208. In particular, the NoSQL component or module 208 can include a NoSQL database ("DB") utilized for storage of processed data in the framework. This can be utilized for application programming interface ("API") retrieval and for serving any real-time user interface ("UI") requirements. Here, aggregated and correlated data can be stored in the NoSQL DB. The HUC engine 200 may also include a MySQL component or module 210. Here, the MySQL component or module 210 MySQL can also be utilized for storage of processed data in the framework. This can be utilized for API retrieval and for serving any real-time UI requirements. The aggregated and correlated data may also be stored in MySQL. However, it is contemplated within the scope of the present disclosure described herein that any type of relational database management system ("RDBMS") may also be used in lieu of or in addition to MySQL. Further, the HUC engine 200 can include an HDFS component or module 212. Here, the HDFS component or module 212 can be a Hadoop Distributed File System which can be used for storage of raw data. In particular, all batched data sources can be initially stored into HDFS and then processed using Spark jobs, or the Spark module. Further, NoSQL or the NoSQL module can also utilize HDFS as its data storage infrastructure.

Figure 3:
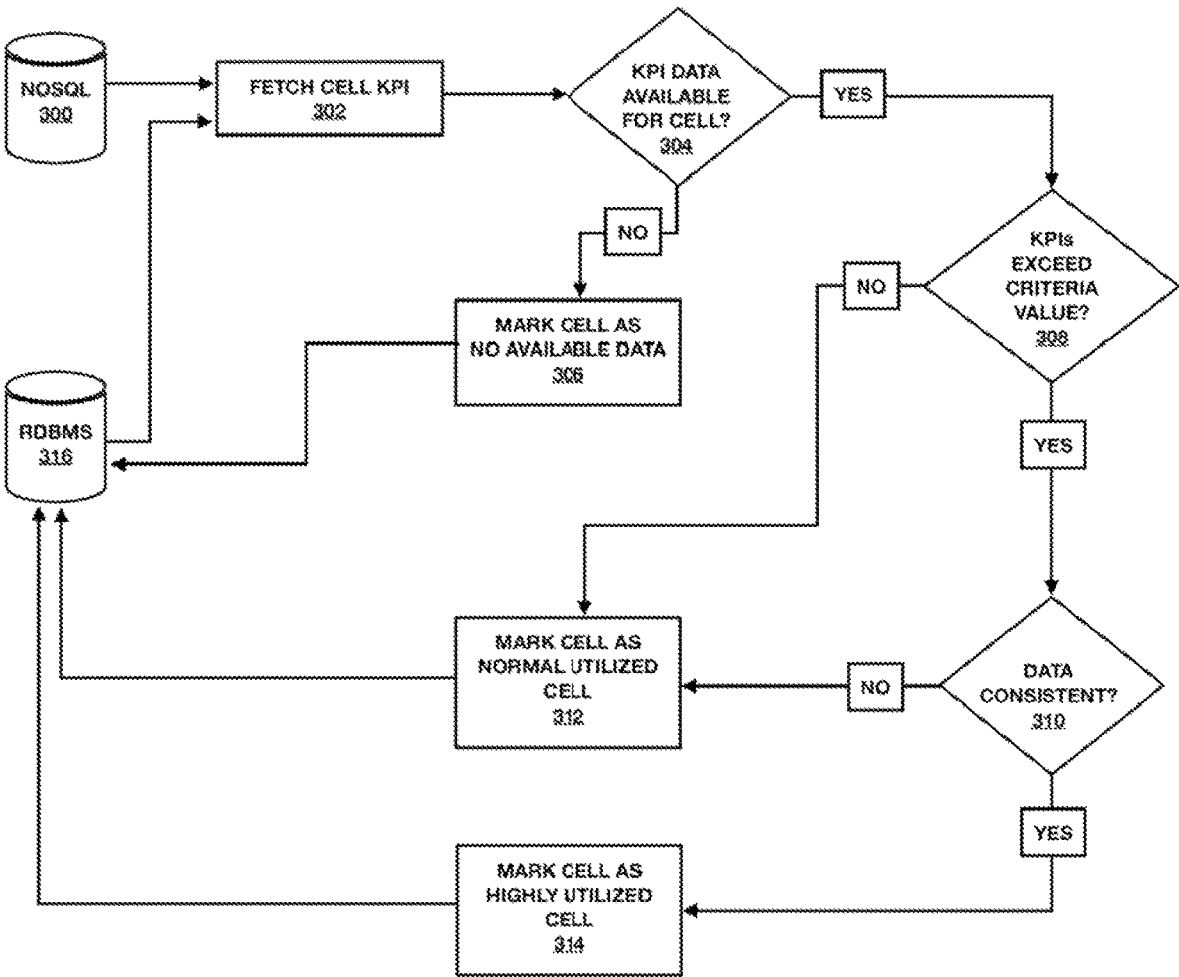
FIG. 3 illustrates a flowchart of a method for identifying a highly utilized cell according to one or more embodiments.

FIG. 3 illustrates a flowchart of a method for identifying a highly utilized cell according to one or more embodiments. Referring to FIG. 3, at step 302, each cell KPI data (particular cell(s) or specified cells) from the network is fetched, retrieved, or received from either or both of the NoSQL database 300 and the MySQL database or RDBMS 316. At step 304, it is determined whether KPI data is available for the particular cell(s). If the KPI data is available for the particular cell(s), then the process can proceed to step 306, wherein the process can mark, designate, or identify the cell having no available data, wherein such designation can be stored within the RDBMS 316. Alternatively, at step 304, if the KPI data is available for the particular cell(s), then the process can proceed to step 308. At step 308, it is determined whether KPI values for the particular cell(s) meet or exceed one or more user defined or pre-defined criteria or threshold values conditions. If the criteria values are not met or exceeded, then the process can proceed to step 312, wherein the process can mark, designate, or identify the cell as being a normal utilized cell, wherein such designation can be stored within the RDBMS 316. Alternatively, at step 308, if it is determined that the KPI values for the particular cell(s) meet or exceed the one or more criteria values, then the process can proceed to step 310. At step 310, a consistency check or process is performed to determine if the KPI data is consistent, namely, the KPI data being consistent within a defined number of days with respect to another defined time period or number of days, such as the KPI data being consistent for seven (7) out of ten (10) days for exemplary purposes. If the KPI data is not consistent, then the process can proceed to step 312, wherein the process can mark, designate, or identify the cell as being a normal utilized cell, wherein such designation can be stored within the RDBMS 316. Alternatively, at step 310, if the KPI data is consistent, then the process can proceed to step 314, wherein the process can mark, designate, or identify the cell as being a HUC, wherein such designation can be stored within the RDBMS 316.

Figure 4:
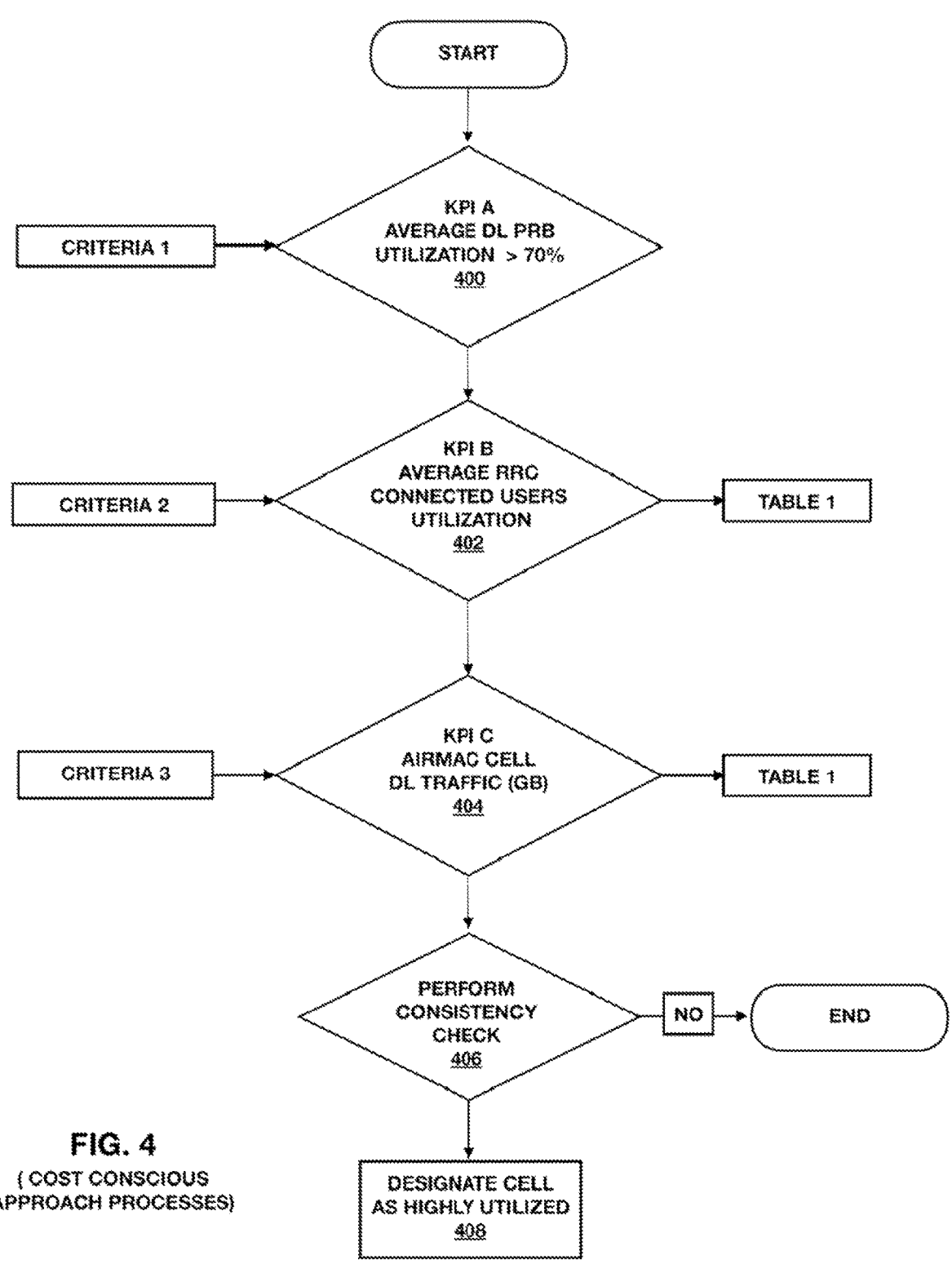
FIG. 4 illustrates a flowchart of a first method for identifying a highly utilized cell according to one or more embodiments.
Figure 5:
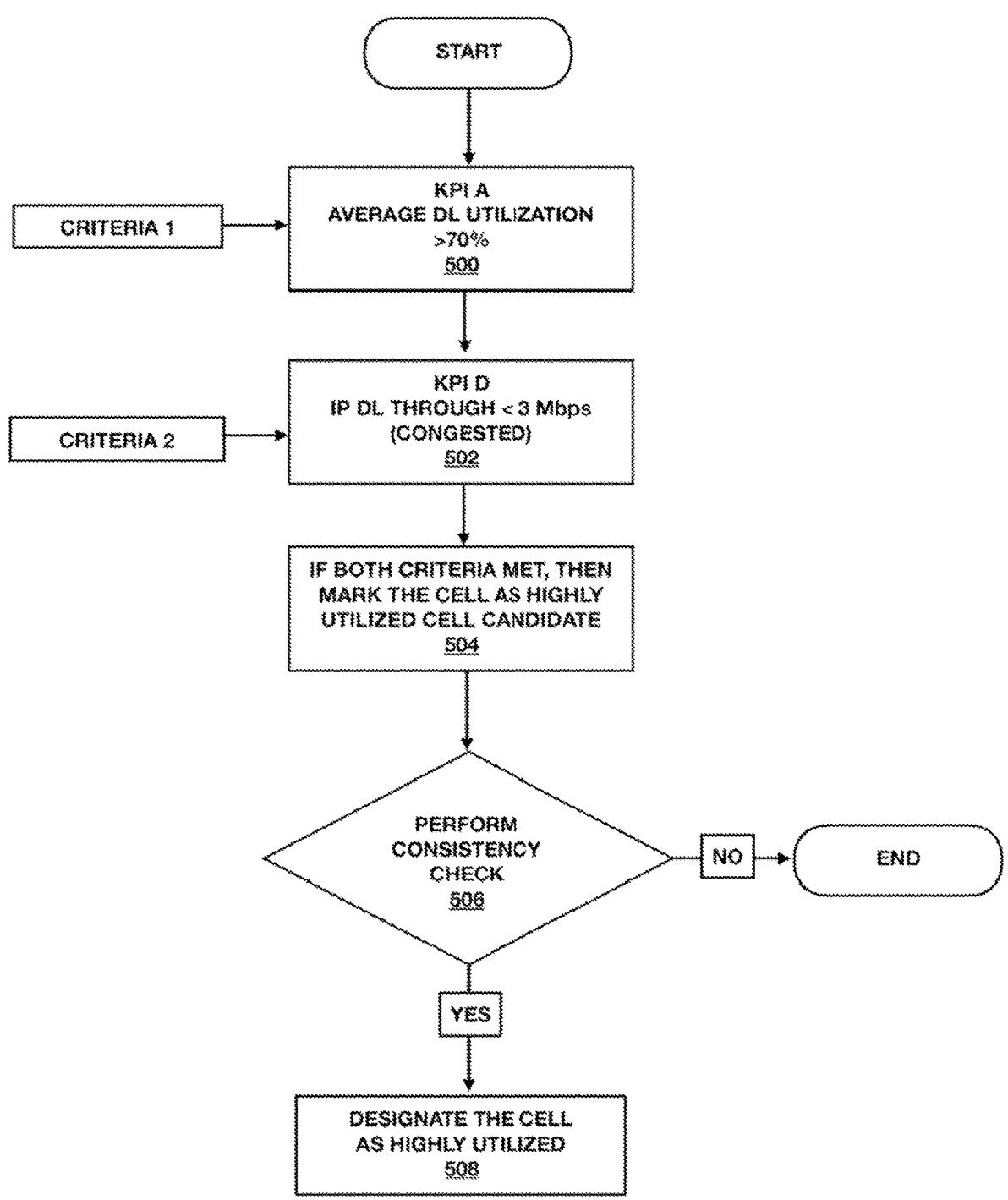
FIG. 5 illustrates a flowchart of a second method for identifying a highly utilized cell according to one or more embodiments.

Here, the HUC engine and HUC identifying and monitoring process and system of one or more embodiments described herein can be divided into three sub-parts and processes, each having its own dashboard within a portal and GUI, e.g., a cost-conscious approach process (FIG. 4), a balanced approach process (FIG. 5), and a quality conscious approach process (FIG. 5).

In particular, FIG. 4 illustrates a flowchart of a first method for identifying a highly utilized cell. By way of example, the first method is a cost-conscious approach. Referring to FIG. 4, at step 400, with respect to a particular cell within a network (or a plurality of cells), a user can select a first KPI, such as KPI A pertaining to Average DL PRB Utilization >70%. Next the user can define a first criteria for KPI A, such as shown in TABLE 1 for ">70%" criteria for each designated band/bandwidth for exemplary purposes. As used herein, a criteria can also be referred to as a threshold condition or event. If the first criteria is met, then the process can proceed to step 402. At step 402, the user can select a second KPI, such as KPI B pertaining to Average RRC Connected Users Utilization. Next, the user can define a second criteria for KPI B, such as shown in TABLE 1 for ">100" criteria for each designated band/bandwidth for exemplary purposes. If the second criteria is met, then the process can proceed to step 404. At step 404, the user can select a third KPI, such as KPI C pertaining to AirMac Cell DL Traffic (GB). Next the user can define a third criteria for KPI B, such as shown in TABLE 1 for ">3" criteria for each designated band/bandwidth for exemplary purposes. If the third criteria is met, then the process can proceed to step 406. Prior to step 406, the process can mark, identify, or designate the cell as a HUC candidate. At step 406, the process can perform a consistency check. Here, the user can define a certain number of days over a period of days that the KPI data should be consistent. For exemplary purposes, to identify a HUC, the user can define three (3) days out of seven (7) days for which the KPI data is consistent, or alternatively, seven (7) out of ten (10) days. If the KPI data passes the consistency test, then the process can mark, designate, and identify the cell as a HUC. Otherwise, if the KPI data does not pass the consistency check, then the process can end and the process can mark, identify, or designate the cell as a normal utilized cell. The results of the process and operation with respect to the cost-conscious approach can be shown on various GIS view maps within a portal, such as shown in FIGS. 8A-8B and 9A-9B.

Throughput <3 Mbps (Congested). Next, the user can define a second criteria for KPI D. At step 504, if both the first and second criteria's with respect to KPI A and KPI D are met, then the process can designate the cell as a HUC candidate. At step 506, the process can perform a consistency check. Here, the user can define a certain number of days over a period of days that the KPI data should be consistent. For exemplary purposes, to identify a HUC, the user can define three (3) days out of seven (7) days for which the KPI data is consistent, or alternatively, seven (7) out of ten (10) days. If the KPI data passes the consistency test, then the process can mark, designate, and identify the cell as a HUC at step 508. Otherwise, if the KPI data does not pass the consistency check, then the process can end and the process can mark, identify, or designate the cell as a normal utilized cell. The results of the process and operation with respect to the balanced approach can be shown on various GIS view maps within a portal, such as shown in FIGS. 8A-8B and 9A-9B.

Figure 6:
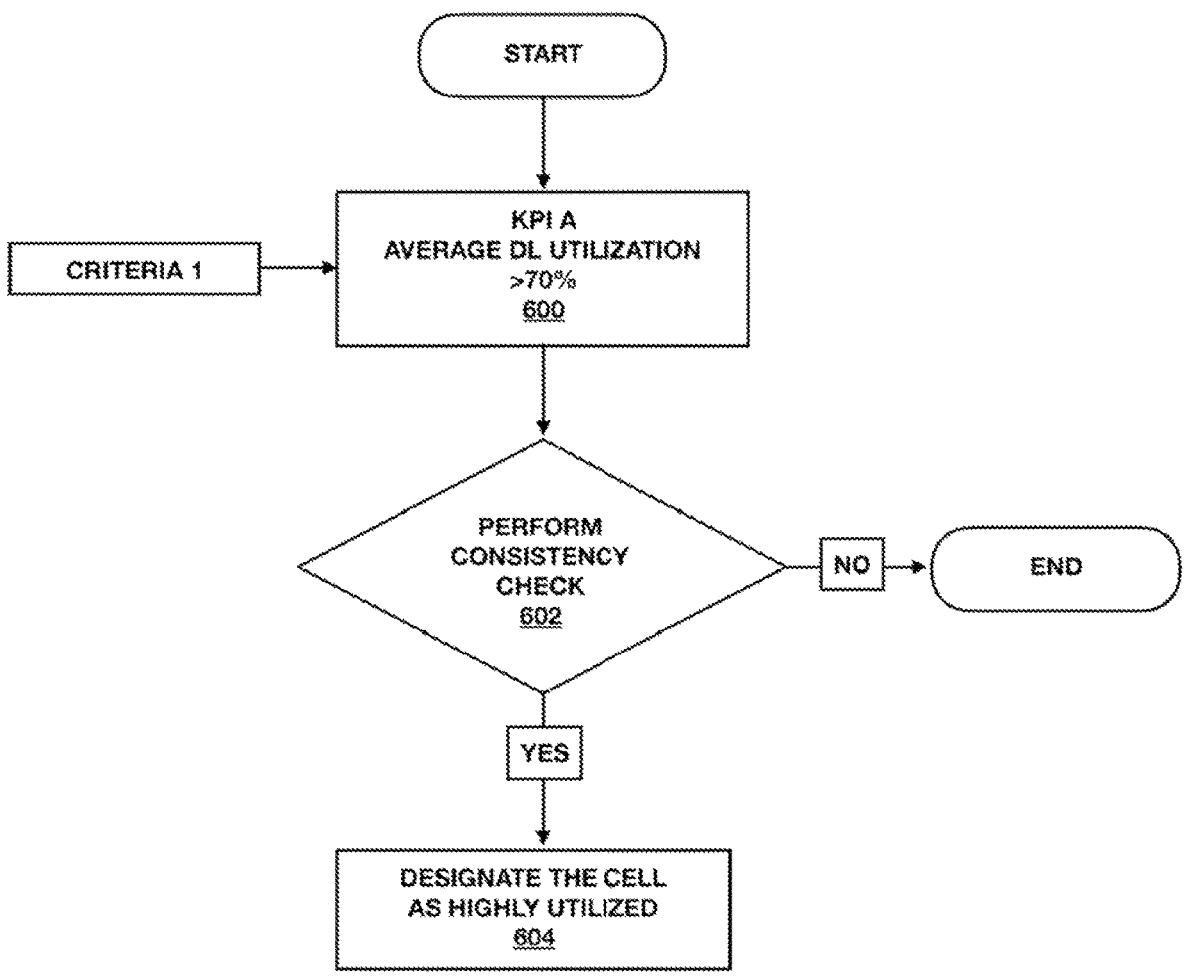
FIG. 6 illustrates a flowchart of a third method for identifying a highly utilized cell according to one or more embodiments.

FIG. 6 illustrates a flowchart of a third method for identifying a highly utilized cell according to one or more embodiments. By way of example, the third method is a quality conscious approach. Referring to FIG. 6, at step 600, with respect to a particular cell within a network (or a plurality of cells), a user can select a first KPI, such as KPI A pertaining to Average DL PRB Utilization >70%. Next, the user can define a first criteria for KPI A. Here, if the first criteria with respect to KPI A is met, then the process can designate the cell as a HUC candidate and proceed to step 602. At step 602, the process can perform a consistency check. Here, the user can define a certain number of days over a period of days that the KPI data should be consistent. For exemplary purposes, to identify a HUC, the user can define three (3) days out of seven (7) days for which the KPI data is consistent, or alternatively, seven (7) out of ten (10) days. If the KPI data passes the consistency test, then the process can mark, designate, and identify the cell as a HUC at step 604. Otherwise, if the KPI data does not pass the consistency check, then the process can end and the process can mark, identify, or designate the cell as a normal utilized cell. The results of the process and operation with respect to the quality conscious approach can be shown on various GIS view map within a portal, such as shown in FIGS. 8A-8B and 9A-9B.

FIGS. 7, 8A-8B, 9A-9B, and 10 illustrate various non-limiting exemplary embodiments of GUI portals and visual representations with respect to the system, apparatus, com-

TABLE 1

| KPI Name | Band/Bandwidth 2300 C1/120 | Band/Bandwidth 2300 C2/10 | Band/Bandwidth 850/10 |
|---|---|---|---|
| KPI A - Average DL PRB Utilization > 70% | >70% | >70% | >70% |
| KPI B - Average RRC Connected Users Utilization | >100 | >2 | >150 |
| KPI C - AirMac Cell DL Traffic (GB) | >3 | >2 | >2 |

Figure 7:
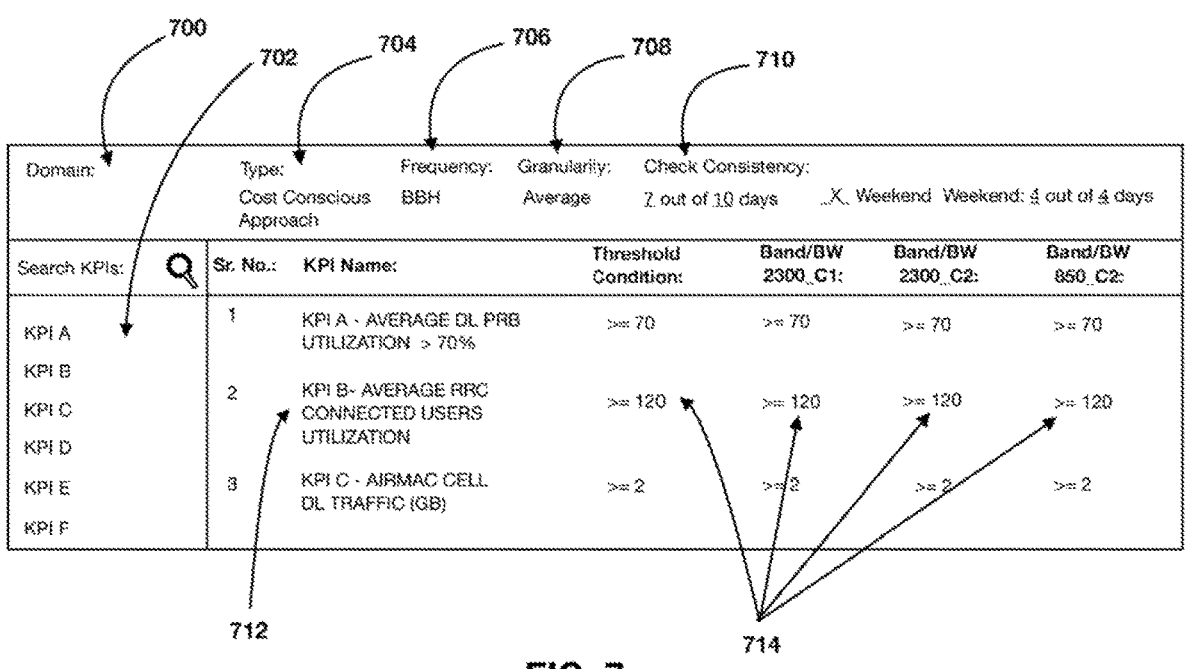
FIG. 7 illustrates an example graphical user interface dashboard according to one or more embodiments.

FIG. 5 illustrates a flowchart of a second method for identifying a highly utilized cell according to one or more embodiments. By way of example, the second method is a balanced approach. Referring to FIG. 5, at step 500, with respect to a particular cell within a network (or a plurality of cells), a user can select a first KPI, such as KPI A pertaining to Average DL PRB Utilization >70%. Next, the user can define a first criteria for KPI A. At step 502, the user can select a second KPI, such as KPI D pertaining to IP puter-readable medium, and processes disclosed with respect to any of FIGS. 1-6. In particular, FIGS. 7, 8A-8B, 9A-9B, and 10 illustrate GUI portals for a user to select and define various parameters pertaining to the HUC engine and HUC identifying and monitoring process and system of one or more embodiments described herein and further viewing cells (such as HUC and normal utilized cells) on a GIS view map, among others. For example, FIG. 7 illustrates an example dashboard portal wherein the user can define or select a domain or network within region 700, such as a Radio Access Network (RAN), including a vendor or wireless carrier, wherein such domain includes the one or more cells (such as small cells, macro cells, etc.) to be monitored and analyzed via the foregoing HUC process of one or more embodiments described herein. Within GUI region 702, the user can search and select among several types of different KPIs to be used for the analysis. Further, within region 704, the user can select the type of approach process it wants to use, such as the aforementioned and disclosed cost-conscious approach, balanced approach, and quality conscious approach. Within region 704, the user can also select the frequency for which to run the process, such as BBH. Within region 706, the user can also select a granularity for the process, such as average. Within region 710, the user can set and define the aforementioned and disclosed consistency check process, such as seven (7) out of ten (10) days, including factoring any weekends. Within region 712, the selected KPI's can be displayed within the KPI Name column. In addition, within region 714, the user can set and define each criteria for each respective KPI, and for each band and bandwidth (BW).

Figure 8A:
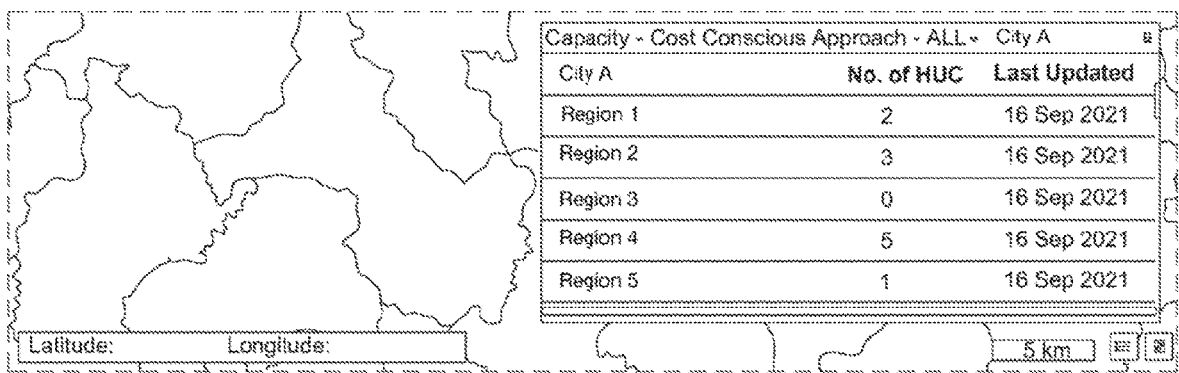
FIG. 8A illustrates an example graphical user interface map according to one or more embodiments.
Figure 8B:
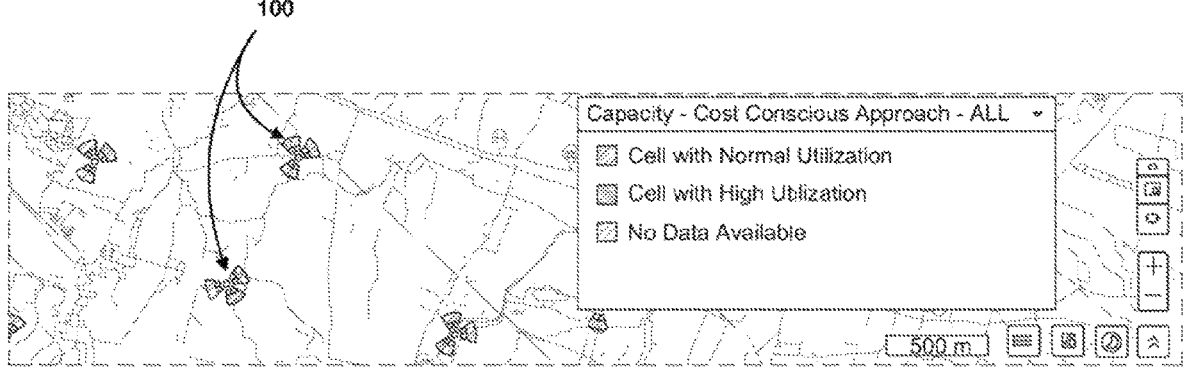
FIG. 8B illustrates an example graphical user interface map according to one or more other embodiments.

FIG. 8A illustrates an example GUI portal that further illustrates a map and a results report for the number of HUCs identified for each particular region within a city, province, or district, according to one or more embodiments. FIG. 8B illustrates an example GIS map view portal of various cells 100 within a given region that can be designated as either HUC cells, normal utilization cells, or cells having no available data, according to one or more embodiments. Here, the foregoing data can be visualized on the map with a zoom level of about 500 km to about 5 km, by way of example, and wherein cell sites can be visualized along with their legend and filters from about 3 km to 100 m, by way of example. Still referring to FIG. 8B, a legend can be provided wherein each cell designation can be color-coded or have any other type of indicia such that the cells can be visually identified on the map as being either HUC cells, normal utilization cells, or cells having no available data.

Figure 9A:
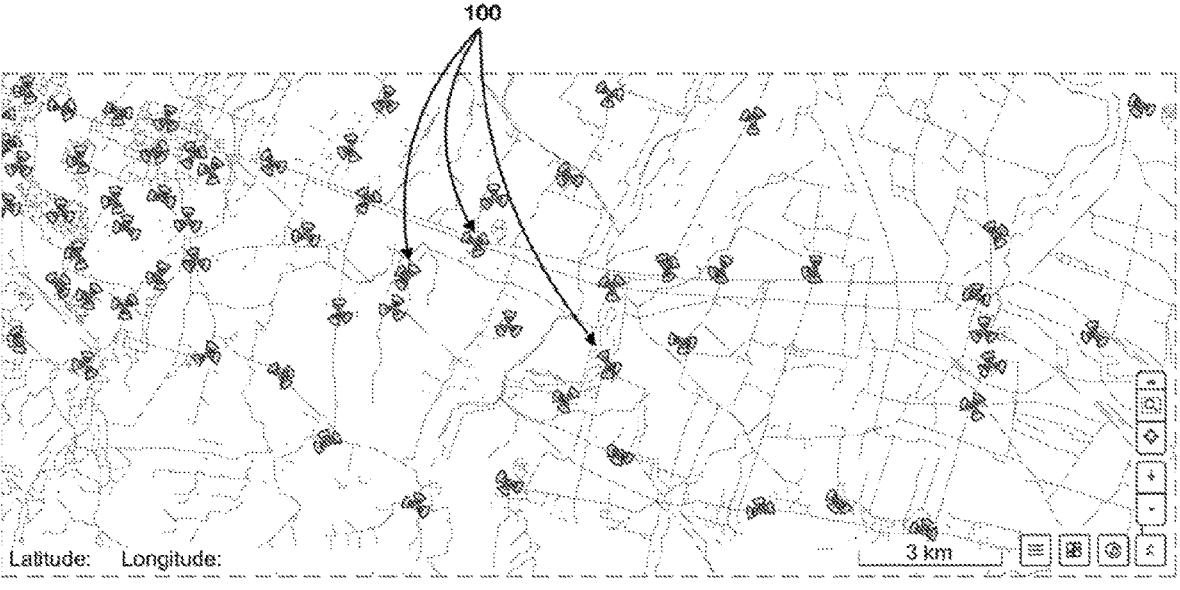
FIG. 9A illustrates an example graphical user interface map according to one or more other embodiments.
Figure 9B:
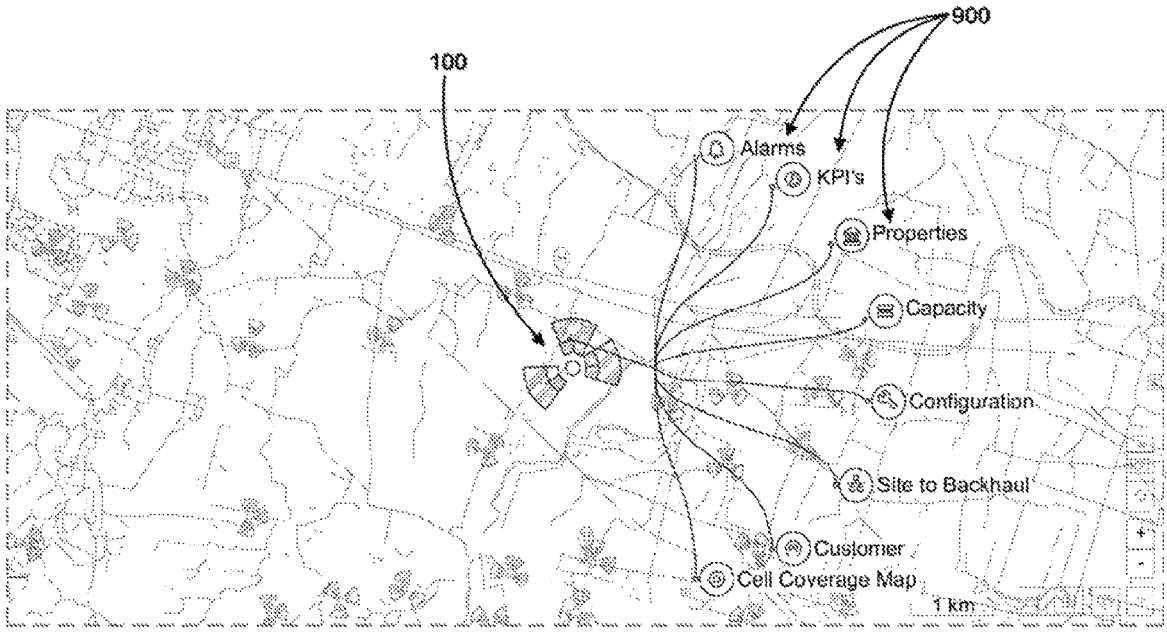
FIG. 9B illustrates an example graphical user interface map according to one or more other embodiments.

FIG. 9A illustrates an example GUI map view portal of each cell 100 (such as small cells, macro cells, etc.) of the network within a defined zoom level that can be designated as either a HUC, normal utilized cell, or cell having no data with respect to any of the aforementioned and disclosed approach processes, such as the cost-conscious approach, balanced approach, and quality conscious approach, according to one or more embodiments. FIG. 9B illustrates a GUI map view portal close-up view of a particular selected cell by the user on the map, such as from the map illustrated in FIG. 9A, according to one or more embodiments. In particular, once the user selects a particular cell 100 from any of the GIS view maps, then an expanded "spider" view 900 can be shown to the user. Here, the expanded spider view of the selected cell can include various types of data, properties, and reports pertaining to that particular cell that the user can view further. For example, if the user selects any of the expanded options, such as as "KPI's", then the user can be directed to a GUI portal that can display the KPIs for that particular cell, wherein KPI's that are highly utilized (with respect to a HUC) can be color-coded to a color that is distinct from KPI's that are normally utilized (with respect to a normal utilized cell).

FIG. 10 illustrates a GUI dashboard portal, such as a RAN capacity dashboard that can illustrate the output from the foregoing HUC engine and HUC identifying and monitoring process and system of the disclosure described herein. Here, the user can view various parameters pertaining to each region within a particular network, including but not limited to, total cells, daily total traffic (TB), BBH traffic (TB), HUC's, percent (%) change in HUC from same day previous week, class 1 sectors, and class 2 sectors, among others. In addition, the user can view other data, including but not limited to, daily total traffic (for the last ten days), BBH traffic (for the last days), total highly utilized cells (for the last ten days), and consistent critically congested cells count (for the last ten days), among others. Here, with respect to any of FIGS. 7, 8A-8B, 9A-9B, and 10, such outputted data and reports can be stored within a database and the user can download any data, report, or map from within any of the GUI portals.

It is contemplated within the scope of the disclosure described herein that any type or category of cellular network KPI data may be used within the HUC engine and HUC monitoring process and system of the disclosure described herein. For example, such KPI data may pertain to various categories, including but not limited to: accessibility, retainability, integrity, availability, and mobility. Specifically, test cases for such KPI data may include, but is not limited to: Average DL PRB Utilization, Average RRC Connected Users Utilization, AirMac Cell DL Traffic, RRC Connection Establishment, Random Access, Initial E-RAB Establishment Success Rate, Added E-RAB Establishment Success Rate S1 Signaling Connection Establishment, MME Initiated E-RAB & UE Context Release with counters Description, EUTRAN Throughput KPIs, X2 Based Handover Preparation & Execution, Intra RBS Handover Preparation & Execution, RRC Connection Establishment Counters, Initial E-RAB Establishment Success Rate Counters, Added E-RAB Establishment Success Rate Counters, Intra Frequency Handover Preparation & Execution Counters, S1 Based Handover Preparation & Execution, EUTRAN Latency KPIs, EUTRAN Packet Loss KPIs, MME & RBS Initiated E-RAB Release Flow Chart, UE Session Time, RBS Initiated E-RAB & UE Context Release with counters Description, Intra-frequency intra-LTE S1 & X2 Handover Flowchart, Inter Frequency Handover Preparation & Execution Counters, Inter-frequency intra-LTE S1 & X2 Handover Flowchart, MME & RBS Initiated UE Context Release Flow Chart, and partial cell availability. In addition, such KPI data may also include Quality of Sever (QoS) parameters.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of identifying utilized cells within a network based on one or more key performance indicators, the method comprising:
    receiving first key performance indicator (KPI) data with respect to a cell within the network;
    receiving a first criteria with respect to the first KPI data;
    determining if the first KPI data meets the first criteria; and
    identifying whether the cell is a highly utilized cell based on the determining, wherein the identifying whether the cell is the highly utilized cell comprises:

upon determining that the first KPI data meets the first criteria, determining if the first KPI data is consistent over a defined period; and upon determining that the first KPI data is consistent, designating the cell as a cell that comprises high network utilization or above average network utilization.

2. The method of claim 1, wherein the identifying whether the cell is the highly utilized cell comprises:

receiving a second KPI data with respect to the cell within the network;

receiving a second criteria with respect to the second KPI data; and determining if the second KPI data meets the second criteria.

3. The method of claim 2, wherein the identifying whether the cell is the highly utilized cell further comprises:

upon determining that the first KPI data meets the first criteria and the second KPI data meets the second criteria, determining if the first KPI data and the second KPI data are consistent over a defined period; and upon determining that the first KPI data and the second KPI data are consistent, designating the cell as a cell that comprises high network utilization or above average network utilization.

4. The method of claim 2, wherein the identifying whether the cell is the highly utilized cell further comprises:

receiving a third KPI data with respect to the cell within the network;

receiving a third criteria with respect to the third KPI data;

determining if the third KPI data meets the third criteria;

upon determining that the first KPI data meets the first criteria, the second KPI data meets the second criteria, and the third KPI data meets the third criteria, determining if the first KPI data, second KPI data, and third KPI data are consistent over a defined period; and upon determining that the third KPI data is consistent, designating the cell as a cell that comprises high network utilization or above average network utilization.

5. The method of claim 1, further comprising:

upon determining that the first KPI data does not meet the first criteria, designating the cell as a cell that comprises normal or average network utilization.

6. The method of claim 1, wherein the defined period comprises a first number of days out of a second number of days, the first number of days and the second number of days both being greater than zero.

7. The method of claim 1, further comprising:

receiving input parameters with respect to at least one: cell site inventory data, cell site boundaries data, or cell site performance management data.

8. The method of claim 1, further comprising:

displaying the designated high network utilization or above average network utilization cell on a graphical user interface map.

9. The method of claim 8, further comprising:

receiving a selection of the cell on the graphical user interface map; and displaying an expanded view of the cell, wherein the displayed expanded view comprises one or more properties associated with the cell.

10. An apparatus for identifying utilized cells within a network based on one or more key performance indicators, the apparatus comprising:

a memory storage storing computer-executable instructions; and a processor communicatively coupled to the memory storage, wherein the processor is configured to execute the computer-executable instructions and cause the apparatus to:

receive, from a user, a first key performance indicator (KPI) data with respect to a cell within the network;

receive, from the user, a first criteria with respect to the first KPI data;

determine if the first KPI data meets the first criteria; and identify whether the cell is a highly utilized cell based on whether the first KPI data is determined to meet the first criteria, wherein the computer-executable instructions, when executed by the processor, further cause the apparatus to:

upon determining that the first KPI data meets the first criteria, determine if the first KPI data is consistent over a defined period; and upon determining that that the first KPI data is consistent, designate the cell as a cell that comprises high network utilization or above average network utilization.

11. The apparatus of claim 10, wherein the computer-executable instructions, when executed by the processor, further cause the apparatus to:

receive, from the user, a second KPI data with respect to the cell within the network;

receive, from the user, a second criteria with respect to the second KPI data; and determine if the second KPI data meets the second criteria.

12. The apparatus of claim 11, wherein the computer-executable instructions, when executed by the processor, further cause the apparatus to:

upon determining that the first KPI data meets the first criteria and the second KPI data meets the second criteria, determine if the first KPI data and the second KPI data are consistent over a defined period; and upon determining that the first KPI data and the second KPI data are consistent, designate the cell as a cell that comprises high network utilization or above average network utilization.

13. The apparatus of claim 11, wherein the computer-executable instructions, when executed by the processor, further cause the apparatus to:

receive, from the user, a third KPI data with respect to the cell within the network;

receive, from the user, a third criteria with respect to the third KPI data;

determine if the third KPI data meets the third criteria;

upon determining that the first KPI data meets the first criteria, that the second KPI data meets the second criteria, and that the third KPI data meets the third criteria, determine if the first KPI data, second KPI data, and third KPI data are consistent over a defined period; and upon determining that the third KPI data is consistent, designate the cell as a cell that comprises high network utilization or above average network utilization.

14. The apparatus of claim 10, wherein the computer-executable instructions, when executed by the processor, further cause the apparatus to:

upon determining that the first KPI data does not meet the first criteria, designate the cell as a cell that comprises normal or average network utilization.

15. The apparatus of claim 10, wherein the defined period comprises a first number of days out of a second number of days, the first number of days and the second number of days both being greater than zero.

16. The apparatus of claim 10, wherein the computer-executable instructions, when executed by the processor, further cause the apparatus to:

display the designated high network utilization or above average network utilization cell on a graphical user interface map.

17. A non-transitory computer-readable medium comprising computer-executable instructions for identifying utilized cells within a network based on one or more key performance indicators by an apparatus, wherein the computer-executable instructions, when executed by at least one processor of the apparatus, cause the apparatus to:

receive first key performance indicator (KPI) data with respect to a cell within the network;

receive a first criteria with respect to the first KPI data;

determine if the first KPI data meets the first criteria; and identify whether the cell is a highly utilized cell based on whether the first KPI data is determined to meet the first criteria, wherein the computer-executable instructions, when executed by the at least one processor, further cause the apparatus to:

upon determining that the first KPI data meets the first criteria, determine if the first KPI data is consistent over a defined period; and upon determining that that the first KPI data is consistent, designate the cell as a cell that comprises high network utilization or above average network utilization.

\* \* \* \* \*